US010255426B2

(12) United States Patent
Maeng et al.

(10) Patent No.: US 10,255,426 B2
(45) Date of Patent: Apr. 9, 2019

(54) KEYBOARD DEVICE AND DATA COMMUNICATION METHOD USING THE SAME

(71) Applicant: ELECTRONICS AND TELECOMMUNICATIONS RESEARCH INSTITUTE, Daejeon (KR)

(72) Inventors: YoungJae Maeng, Daejeon (KR); Jonghu Lee, Daejeon (KR); Hyun Dong Park, Daejeon (KR); Sangwoo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 437 days.

(21) Appl. No.: 14/980,966

(22) Filed: Dec. 28, 2015

(65) Prior Publication Data
US 2017/0076084 A1 Mar. 16, 2017

(30) Foreign Application Priority Data
Sep. 15, 2015 (KR) .......................... 10-2015-0130268

(51) Int. Cl.
*G06F 21/44* (2013.01)
*G06F 3/023* (2006.01)
*G06F 3/02* (2006.01)

(52) U.S. Cl.
CPC .............. *G06F 21/44* (2013.01); *G06F 3/023* (2013.01); *G06F 3/0219* (2013.01)

(58) Field of Classification Search
CPC .......... G06F 21/44; G06F 3/0219; G06F 3/023
See application file for complete search history.

(56) References Cited

U.S. PATENT DOCUMENTS

| 6,018,335 A * | 1/2000 | Onley ...................... G06F 3/023 341/22 |
| 6,243,079 B1 * | 6/2001 | Liu ......................... G06F 3/0227 345/158 |

(Continued)

FOREIGN PATENT DOCUMENTS

| EP | 2 590 084 A1 | 5/2013 |
| JP | 2000-010715 A | 1/2000 |

(Continued)

*Primary Examiner* — Kambiz Zand
*Assistant Examiner* — Tongoc Tran
(74) *Attorney, Agent, or Firm* — LRK Patent Law Firm (57) ABSTRACT

A keyboard device and a data communication method using the keyboard device. The data communication method includes generating, by the keyboard device, data that is a set of commands to be executed by a computer using a key input signal that is generated when a key is input, transmitting, by the keyboard device, the generated data to the computer, thus allowing the computer to execute each command corresponding to the data, and receiving, by the keyboard device, results of executing the command corresponding to the data from the computer, wherein the command includes a line coding method to be used when the computer transmits data to the keyboard device, and wherein the computer generates a toggle key signal to correspond to the line coding method and transmits the toggle key signal to the keyboard device.

18 Claims, 4 Drawing Sheets

(56) References Cited

U.S. PATENT DOCUMENTS

| | | | | |
|---|---|---|---|---|
| 6,401,065 B1* | 6/2002 | Kanevsky | ............ | G06F 3/0238 704/256.4 |
| 6,480,587 B1* | 11/2002 | Rao | ............ | G06F 3/023 379/110.01 |
| 6,909,426 B2* | 6/2005 | Chao | ............ | G06F 3/046 178/18.01 |
| 7,215,258 B2* | 5/2007 | Wormald | ............ | G06F 3/0233 340/5.54 |
| 7,831,837 B1* | 11/2010 | Duane | ............ | G06F 21/34 713/185 |
| 8,214,888 B2* | 7/2012 | Noe | ............ | G06F 21/34 726/9 |
| 8,407,380 B2* | 3/2013 | Matsunaga | ............ | G06F 3/038 709/227 |
| 2002/0190957 A1* | 12/2002 | Lee | ............ | G06F 1/1626 345/169 |
| 2005/0050239 A1 | 3/2005 | Kimura | | |
| 2005/0177389 A1* | 8/2005 | Rakowicz | ............ | G06Q 20/3829 705/75 |
| 2006/0192768 A1* | 8/2006 | Lee | ............ | G06F 3/0231 345/173 |
| 2008/0316065 A1* | 12/2008 | Maber | ............ | G06F 3/0219 341/23 |
| 2009/0144558 A1* | 6/2009 | Wang | ............ | G06F 21/83 713/189 |
| 2009/0270036 A1* | 10/2009 | Michaud | ............ | H04W 12/06 455/41.3 |
| 2009/0323938 A1* | 12/2009 | Schneider | ............ | H04L 9/065 380/42 |
| 2010/0275257 A1* | 10/2010 | Nishida | ............ | G06F 21/31 726/19 |
| 2011/0055639 A1* | 3/2011 | Huang | ............ | G06F 3/0233 714/48 |
| 2014/0344927 A1* | 11/2014 | Turgeman | ............ | H04W 12/06 726/22 |
| 2015/0058776 A1 | 2/2015 | Liu et al. | | |
| 2015/0096013 A1* | 4/2015 | Ozolins | ............ | G06F 21/32 726/19 |
| 2016/0087719 A1* | 3/2016 | Baggen | ............ | H04B 10/616 398/120 |

FOREIGN PATENT DOCUMENTS

| | | |
|---|---|---|
| JP | 2000-276286 A | 10/2000 |
| JP | 2005-078496 A | 3/2005 |
| JP | 2009-044398 A | 2/2009 |
| JP | 2011-107956 A | 6/2011 |
| JP | 2012-014426 A | 1/2012 |
| JP | 2012-023746 A | 2/2012 |
| KR | 10-0337603 B1 | 10/2002 |
| KR | 10-1278726 B1 | 7/2013 |
| KR | 10-2014-0094605 A | 7/2014 |

* cited by examiner

KEYBOARD DEVICE AND DATA COMMUNICATION METHOD USING THE SAME

CROSS REFERENCE TO RELATED APPLICATION

This application claims the benefit of Korean Patent Application No. 10-2015-0130268, filed Sep. 15, 2015, which is hereby incorporated by reference in its entirety into this application.

BACKGROUND OF THE INVENTION

1. Technical Field

The present invention generally relates to a keyboard device and a data communication method using the keyboard device and, more particularly, to technology for performing data communication with a computer using a keyboard device.

2. Description of the Related Art

In computers, a toggle key denotes a key that operates such that, when it is pressed once, a certain state is set, and when it is pressed once again, the state is released. That is, a toggle key is a key that enables a specific function to be activated and deactivated using a single key. On a keyboard, such toggle keys may include a [Caps Lock] key, a [Num Lock] key, a [Scroll Lock] key, etc.

For example, if English letters are typed after the [Caps Lock] key is pressed once, upper-case letters may be continuously typed without having to press the [Shift] key. Subsequently, when the [Caps Lock] key is pressed once again, the upper-case letter typing function is deactivated (OFF), and lower-case letters are typed.

Further, the [Pause Break] key may function as a toggle key in such a way that, when it is pressed once, screen output is paused, and when it is pressed once again, the pause state is released. Furthermore, the [Kor/Eng] key functions as a toggle key in such a way that, when it is pressed once, the text input mode switches to a Korean input mode, and when it is pressed once again, the text input mode switches from a Korean input mode back to an English input mode. Similarly to this, the [Num Lock], [Scroll Lock], and [Insert] keys may also function as toggle keys as described above.

Such a toggle key was implemented using hardware when PCs were developed, but may also be implemented using software. For example, in a word processor program, upon switching between Korean and English input modes, the text input mode switches from the English input mode to the Korean input mode if the Spacebar is pressed once in the state in which the [Shift] key is pressed, and switches back to the English input mode if the Spacebar is pressed once again in that state, instead of pressing the [Kor/Eng] key on the keyboard.

This function enables the word processor program to be easily used even in foreign countries using a foreign keyboard that is not equipped with a [Kor/Eng] key, and is a representative example in which a toggle key is set using software. Further, among hot keys, which are shortcut keys defined in a program, some keys may function as toggle keys.

However, a keyboard including toggle keys generally performs only the function of an input device that transmits a key signal input from a user to a computer, and does not perform data communication with the computer.

Therefore, technology for implementing a keyboard as an input/output device capable of performing data communication with the computer is urgently required.

PRIOR ART DOCUMENTS

Patent Documents (Patent Document 1) Korean Patent No. 10-0337603 (Date of publication: Mar. 15, 2000) (entitled "Computer System having a Hot Key for a User Password Identification and Password Identifying Method")

SUMMARY OF THE INVENTION

Accordingly, the present invention has been made keeping in mind the above problems occurring in the prior art, and an object of the present invention is to provide a keyboard for performing data communication with a computer using a standard keyboard interface.

Another object of the present invention is to implement a keyboard as a data input/output device by enabling desired data to be output without installing an additional driver in a keyboard interface.

In accordance with an aspect of the present invention to accomplish the above objects, there is provided a data communication method using a keyboard device, including generating, by the keyboard device, data that is a set of commands to be executed by a computer using a key input signal that is generated when a key is input, transmitting, by the keyboard device, the generated data to the computer, thus allowing the computer to execute each command corresponding to the data, and receiving, by the keyboard device, results of executing the command corresponding to the data from the computer, wherein the command includes a line coding method to be used when the computer transmits data to the keyboard device, and wherein the computer generates a toggle key signal to correspond to the line coding method and transmits the toggle key signal to the keyboard device.

The keyboard device may use a Personal System/2 (P/S2 or Universal Serial Bus (USB) standard keyboard interface.

The line coding method may be Manchester coding.

The keyboard device may encode the data using a Base64 encoding scheme and transmit encoded data to the computer.

The keyboard device may use a clock that is currently used by a keyboard controller or uses any one of toggle keys as the clock.

The data communication method may further include transmitting, by the keyboard device, a preparation request command, required to request the computer to prepare for data communication, to the computer, and receiving, by the keyboard device, a data reception readiness signal from the computer.

The keyboard device may be configured to, when a data reception readiness signal is not received from the computer within a preset time period, periodically transmit a preparation request command to the computer at regular intervals.

The data communication method may further include performing a device authentication procedure between the computer and the keyboard device.

The device authentication procedure may be performed such that the computer monitors a current state of use of at least one toggle key, and such that, when the toggle key is used a preset number of times or more within a preset time period, the computer requests a password from the keyboard device, receives the password from the keyboard device, and then authenticates the keyboard device.

The password may be a password generated by inputting plain text or a password previously shared between the computer and the keyboard device.

In accordance with another aspect of the present invention to accomplish the above objects, there is provided a keyboard device, including a data generation unit for generating data that is a set of commands to be executed by a computer, using a key input signal that is generated when a key is input, and a communication unit for transmitting the generated data to the computer to allow the computer to execute each command corresponding to the data, and receiving results of executing the command corresponding to the data from the computer, wherein the command includes a line coding method to be used when the computer transmits data to the keyboard device, and wherein the computer generates a toggle key signal to correspond to the line coding method and transmits the toggle key signal to the keyboard device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
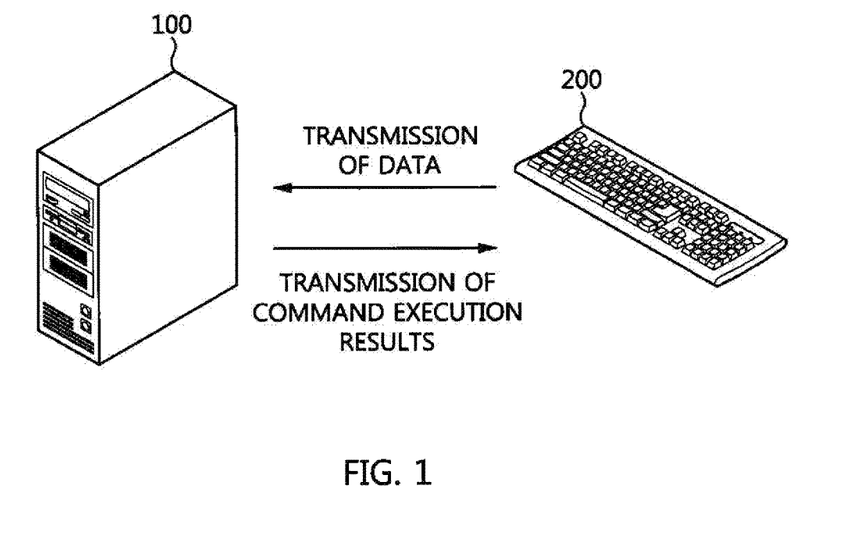
FIG. 1 is a diagram showing a data communication system using a keyboard device according to an embodiment of the present invention.

FIG. 1 is a diagram showing a data communication system using a keyboard device according to an embodiment of the present invention.

As shown in FIG. 1, the data communication system using a keyboard device includes a computer 100 and a keyboard device 200.

First, the computer 100 is a device for receiving data from various types of input devices, processing the received data, storing and searching the processed information, and outputting the results thereof. Examples of the computer 100 may include a Personal Computer (PC), a desktop PC, a notebook computer, a smart board, a tablet PC, etc.

Further, the computer 100 may be any of a smart phone, a smart TV, a navigation device, a mobile device, a handheld device, a handheld computer, a media player, an electronic book (e-book) terminal, a Personal Digital Assistant (PDA), etc.

Furthermore, the computer 100 may be connected to the keyboard device 200 in a wired or wireless manner to perform communication with the keyboard device 200. Also, the computer 100 receives data from the keyboard device 200, executes commands corresponding to data, and transmits the results of execution to the keyboard device 200.

Next, the keyboard device 200 is an input device for inputting a user's operation command or data required to operate the computer 100. The keyboard device 200 may be connected to the computer 100 in a wired or wireless manner to transmit the operation command or data to the computer 100.

Further, the keyboard device 200 according to the embodiment of the present invention may not only transmit data to the computer 100, but also receive the results of executing commands from the computer 100, and output the received execution results.

Also, the keyboard device 200 includes a standard keyboard interface and a keyboard controller. The keyboard interface may be of a Personal System/2 (PS/2) type or a Universal Serial Bus (USB) type.

When the keyboard device 200 is a PS/2-type keyboard, the keyboard has a purple-colored plug. While the computer 100 is operating, the keyboard device 200 cannot be recognized. Accordingly, after the computer 100 is connected to the keyboard device 200, a rebooting process is performed to connect the keyboard device 200 to the computer 100.

Meanwhile, when the keyboard device 200 is a USB-type keyboard, a Plug and Play function is supported, and thus the computer 100 may detect the connection of the keyboard device 200 when the keyboard device 200 is physically connected to the computer 100. Further, since a hot-swapping function is supported, it is possible to connect, disconnect or replace the keyboard device 200 even when the power of the computer 100 is turned on.

The keyboard device 200 may be one of a membrane keyboard, a mechanical keyboard, a pantograph keyboard, a flexible keyboard, and a projection keyboard, which are classified according to the type of switch used in the keys, as well as a development board or device that includes a keyboard controller, such as Teensy.

Further, the keyboard device 200 is composed of multiple keys, for example, 101, 104 or 106 keys, but may be composed of a smaller number of keys when the computer 100 is a portable device such as a notebook PC. The keys on the keyboard device 200 includes alphanumeric keys, function keys, combination keys, navigation keys, auxiliary keys, and system command keys, and also includes toggle keys that can switch between two states.

Such a toggle key operates such that, when it is pressed once, a certain value is set, and when it is pressed once again, the certain value is changed to another value. The types of toggle keys may include a [Caps Lock] key, a [Num Lock] key, a [Scroll Lock] key, etc.

For example, the [Caps lock] key is used to switch from a lower-case letter input mode for alphabet letters to an upper-case letter input mode, and the [Num Lock] key is used to activate a numeric keypad so that the keys on the numeric keypad may be used to enter numbers. When the [Num Lock] key is deactivated (OFF), the corresponding keys are used to move a cursor or scroll on the screen. Further, the [Scroll Lock] key is used to control the effect of cursor control keys, and influences the effect of the cursor control keys when the [Scroll Lock] key is activated (ON).

Figure 2:
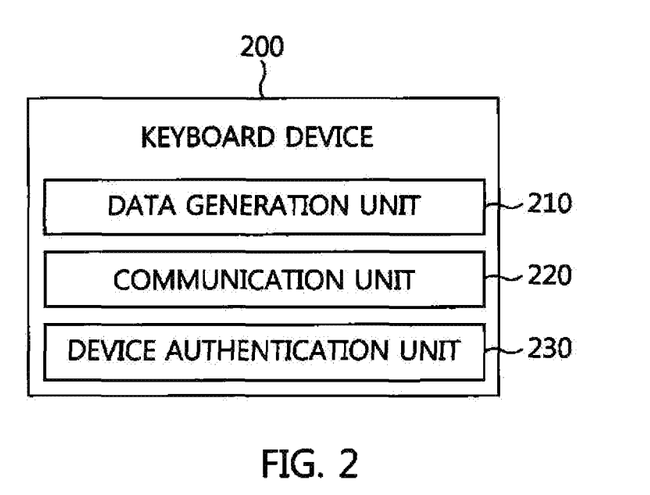
FIG. 2 is a block diagram showing the configuration of a keyboard device according to an embodiment of the present invention.

FIG. 2 is a block diagram showing the configuration of a keyboard device according to an embodiment of the present invention.

Referring to FIG. 2, the keyboard device 200 includes a data generation unit 210, a communication unit 220, and a device authentication unit 230.

First the data generation unit 210 generates data, which is a set of commands to be executed by the computer using a key input signal generated when a key is input.

The data to be transmitted from the data generation unit 210 to the computer 100 may be defined in advance. The data generation unit 210 may automatically transmit data, i.e., a set of commands, to the computer 100 without receiving a key pressed by the user on the keyboard.

Here, the data include a line coding method to be used when the computer 100 transmits signals, such as the results of executing commands, to the keyboard device 200, and line coding may include simple binary code, line coding used for Ethernet transmission, etc.

Further, since keys on the keyboard device 200 are mainly alphanumeric keys, the data generation unit 210 may generate data using an encoding scheme such as Base64, which is an encoding scheme favorable for the transmission of characters and numbers, and when transmitting data, or may use an encoding scheme such as Multipurpose Internet Mail Extensions (MIME), Universal Transformation Format-7 (UTF-7), OpenPGP (Open Pretty Good Privacy), Request For Comments (RFC) 3548, or RFC 4648. However, the encoding scheme of the present invention is not limited to these examples.

Here, Base64 denotes an encoding scheme for converting 8-bit binary data, such as the data in an executable file or a compressed (ZIP) file, into a series of character strings composed of only common ASCII area characters, which are not influenced by character code. Further, the data generation unit 210 may generate data so that the data contains information prompting both encoding and decoding to be performed using Base64 when the computer 100 and the keyboard device 200 perform data communication.

Next, the communication unit 220 transmits the generated data to the computer 100 to allow the computer 100 to execute the commands included in the data.

At this time, the computer 100 may execute commands via the Command Prompt (cmd) in Windows, and may also execute commands on UNIX-like Operating Systems (OS).

Further, the communication unit 220 receives the results of executing the commands from the computer 100. The computer 100 generates a signal using a toggle key in conformity with a line coding method and transmits the signal to the keyboard device 200. The communication unit 220 receives the signal from the computer 100. Here, in a Windows environment, the computer 100 may use a toggle key based on the SendKeys command of Visual Basic Script (VBScript).

Further, the communication unit 220 may transmit a preparation request command, which is required in order to request preparation for data communication, to the computer 100, and may receive a reception readiness signal from the computer 100.

The preparation request command is intended to request preparation so that the computer 100 receives data and executes the commands. When the computer 100 is ready to receive data, it transmits a reception readiness signal to the keyboard device 200. Here, the reception readiness signal may be generated in such a way that the computer 100 generates a toggle key signal using a line coding method included in the preparation request command.

Further, the device authentication unit 230 performs a device authentication procedure between the computer 100 and the keyboard device 200. When a device authentication request is received from the computer 100, the device authentication unit 230 transmits a password to the computer 100 to allow the device authentication procedure to be performed.

In this case, the computer 100 monitors the current state of use of at least one toggle key, and requests a password from the keyboard device 200 when the toggle key has been used a preset number of times or more within a preset time period. Further, the password may be received from the keyboard device 200 and may then be used to perform device authentication. Here, the password may be a password that is directly input by the user, a password that is previously shared between the computer and the keyboard device, or a password that is shared using a key exchange/sharing protocol.

Hereinafter, the data communication method using the keyboard device according to an embodiment of the present invention will be described in greater detail with reference to FIGS. 3 and 4.

Figure 3:
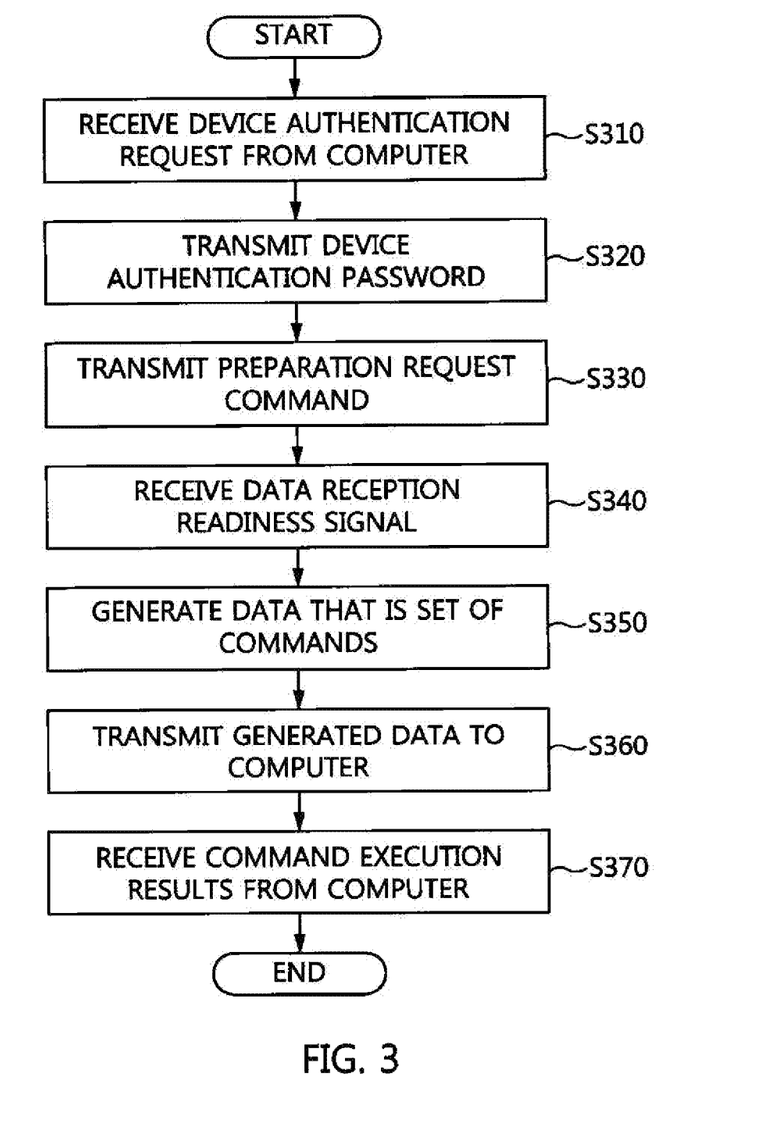
FIG. 3 is a flowchart showing a data communication method using the keyboard device according to an embodiment of the present invention.

FIG. 3 is a flowchart showing the data communication method using the keyboard device according to an embodiment of the present invention.

First, the keyboard device 200 receives a device authentication request from the computer 100 at step S310.

The computer 100 monitors the current state of use of at least one toggle key on the keyboard device 200, and transmits a device authentication request to the keyboard device 200 when it is detected that the toggle key have been used a preset number of times or more within a preset time period. Here, the device authentication request may be a signal requesting a password.

Then, the keyboard device 200 transmits a device authentication password to the computer 100 at step S320.

If the device authentication request is a signal requesting a password at step S310, the keyboard device 200 transmits a password to the computer 100. The computer 100 having received the password performs device authentication by comparing the received password with plain text or a preset password.

For the convenience of description, although a description has been made such that the computer 100 and the keyboard device 200 perform a device authentication procedure at steps S310 and S320, the present invention is not limited thereto, and it is possible that the computer 100 and the keyboard device 200 according to the embodiment of the present invention may proceed to step S330 without performing a device authentication procedure.

Next, the keyboard device 200 transmits a preparation request command to the computer 100 at step S330.

The preparation request command is transmitted in order for the keyboard device 200 to request the computer 100 to prepare for data communication, and may differ depending on the OS or the version of the computer 100. For example, when the OS of the computer 100 is Windows OS, the keyboard device 200 may activate an execution window using "Windows key+R", activate a command window using a 'cmd' command, and transmit a preparation request signal for focus input.

Then, the keyboard device 200 receives a data reception readiness signal from the computer 100 at step S340.

The computer 100 generates a data reception readiness signal in response to the received preparation request command, and transmits the data reception readiness signal to the keyboard device 200. Here, the data reception readiness signal means a signal required to notify the keyboard device 200 that the computer 100 is ready to receive data using a toggle key signal. Further, the fact that the computer 100 is ready to receive data means that data may be transmitted using a toggle key.

When the keyboard device 200 according to the embodiment of the present invention has transmitted the preparation request command to the computer 100 at step S330, but cannot receive a data reception readiness signal from the computer 100 within a threshold time period, the keyboard device 200 periodically performs step S330 so that the preparation request command may be transmitted to the computer 100.

For the convenience of description, although a description has been made whereby the computer 100 and the keyboard device 200 perform a data transmission/reception preparation procedure at steps S330 and S340, the present invention is not limited to this example, and the computer 100 and the keyboard device 200 may perform data communication without performing steps S330 and S340.

Next, the keyboard device 200 generates data that is a set of commands at step S350.

The data includes a set of commands to be executed by the computer 100, and includes the line coding method to be used when the computer 100 transmits data to the keyboard device 200. At this time, the line coding method may be Manchester coding. The principle of Manchester coding is that when a single bit is transmitted, a voltage transition occurs in the middle of each bit time, so that the data rate may be detected using the signal received by a receiving stage, synchronization between the receiving stage and the transmitting stage is facilitated, and errors may be reduced.

For the convenience of description, a description has been made whereby the computer 100 uses a Manchester coding method to transmit data to the keyboard device 200. However, the present invention is not limited to this structure, and one of various coding methods such as AMI, 2B1Q, BnZS, Unipolar RZ, Polar RZ, 8B6T, and 4B/5B may be used, but the coding method of the present invention is not limited to a specific method.

Further, the keyboard device 200 transmits the generated data to the computer 100 so that the computer 100 executes a command corresponding to the data at step S360.

The keyboard device 200 may encode the data using a Base64 encoding scheme and transmit the encoded data to the computer 100. Base64 denotes an encoding scheme for converting 8-bit binary data into a series of character strings composed of only common ASCII area characters, which are not influenced by character code.

The data that is transmitted from the keyboard device 200 to the computer 100 may further include a command for requesting the results of executing the command on the computer 100, written in a scripting language such as VBScript or in a compiled language such as C++.

Finally, the keyboard device 200 receives the results of executing the command from the computer 100 at step S370.

The computer 100 executes the command corresponding to the data received from the keyboard device 200. At this time, the computer 100 generates a signal using a toggle key in conformity with a line coding method, and transmits the signal to the keyboard device 200. At this time, as a method using a toggle key, VBScript, which includes the WShell.SendKeys method, may be used in a Windows environment or, alternatively, an xmodmap utility or a setxkbmap command may be used in a UNIX environment.

That is, the computer 100 and the keyboard, device 200 may perform data communication by generating signals using a toggle key in conformity with the line coding method.

Figure 4:
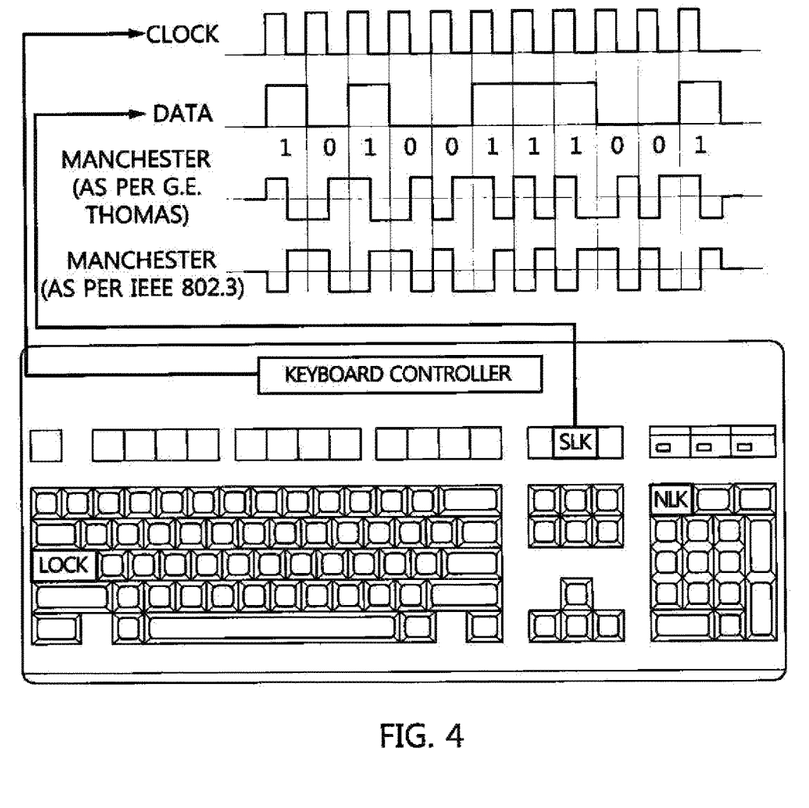
FIG. 4 is a diagram illustrating an example in which a clock currently used by a keyboard controller is utilized according to an embodiment of the present invention.

FIG. 4 is a diagram illustrating an example in which a clock currently used by a keyboard controller is utilized according to an embodiment of the present invention.

As shown in FIG. 4, the keyboard device 200 may implement line coding using the clock, which is currently used by the keyboard controller. Further, any one of toggle keys may be used as a clock, or some or all of the toggle keys may be used. Further, the line coding method may be Manchester (as per G. E. Thomas) coding or Manchester (as per IEEE 802.3) coding.

In accordance with the present invention, a keyboard for performing data communication with a computer using a standard keyboard interface may be provided.

Further, the present invention may implement a keyboard as a data input/output device by enabling desired data to be output without installing an additional driver in a keyboard interface.

As described above, in the keyboard device and data communication method using the keyboard device according to the present invention, the configurations and schemes in the above-described embodiments are not limitedly applied, and some or all of the above embodiments can be selectively combined and configured so that various modifications are possible.

What is claimed is:

1. A data communication method using a keyboard device, comprising:
    transmitting, by the keyboard device, a preparation request command, required to request a computer to prepare for data communication, to the computer; and
    receiving, by the keyboard device, a data reception readiness signal from the computer;
    generating, by the keyboard device, data that is a set of commands to be executed by the computer using a key input signal that is generated when a key is input;
    transmitting, by the keyboard device, after receiving the data reception readiness signal from the computer the generated data to the computer, thus allowing the computer to execute each command corresponding to the data; and
    receiving, by the keyboard device, results of executing the command corresponding to the data from the computer,
    wherein the command includes a line coding method to be used when the computer transmits data to the keyboard device, and
    wherein the computer generates a toggle key signal to correspond to the line coding method and transmits the toggle key signal to the keyboard device,
    wherein the command is executed in a shell of an operating system of the computer, and
    wherein the data includes at least one of a script language and a compile language as the command which requests the results.

2. The data communication method of claim 1, wherein the data is predefined, and the data is generated automatically without input of a key of the keyboard apparatus by an user of the keyboard apparatus.

3. The data communication method of claim 1, wherein the line coding method is Manchester coding.

4. The data communication method of claim 1, wherein the keyboard device encodes the data using a Base64 encoding scheme, and transmits encoded data to the computer.

5. The data communication method of claim 1, wherein the keyboard device uses a clock that is currently used by a keyboard controller or uses any one of toggle keys as the clock.

6. The data communication method of claim 1, wherein the preparation request command is different depending on the operating system or a version of the operation system of the computer, and the preparation request command includes a second command to execute an execution window of the operating system, a third command to execute a shell of the operating system using the execution window, and a fourth command to make the shell have a focus.

7. The data communication method of claim 1, further comprising performing a device authentication procedure between the computer and the keyboard device.

8. The data communication method of claim 1, wherein the computer uses the toggle key in a different way depending on the operating system of the computer.

9. The data communication method of claim 8, wherein the password is shared by a protocol of a key exchange or a key sharing.

10. A keyboard device, comprising:
   a data generation unit for generating data that is a set of commands to be executed by a computer, using a key input signal that is generated when a key is input; and
   a communication unit for transmitting the generated data to the computer to allow the computer to execute each command corresponding to the data, and receiving results of executing the command corresponding to the data from the computer, wherein the communication unit transmits a preparation request command, required to request the computer to prepare for data communication, to the computer, and receives a data reception readiness signal from the computer prior to transmitting the generated data,
   wherein the command includes a line coding method to be used when the computer transmits data to the keyboard device, and
   wherein the computer generates a toggle key signal to correspond to the line coding method and transmits the toggle key signal to the keyboard device,
   wherein the command is executed in a shell of an operating system of the computer, and
   wherein the data includes at least one of a script language and a compile language as the command which requests the results.

11. The keyboard device of claim 10, wherein the data is predefined, and the data generation unit generates the data automatically without input of a key of the keyboard device by an user of the keyboard apparatus.

12. The keyboard device of claim 10, wherein the line coding method is a Manchester coding method.

13. The keyboard device of claim 10, wherein the data is encoded using a Base64 encoding scheme, and encoded data is transmitted to the computer.

14. The keyboard device of claim 10, wherein a clock currently used by a keyboard controller or one of toggle keys is used as a clock.

15. The keyboard device of claim 10, wherein the preparation request command is different depending on the operating system or a version of the operation system of the computer, and
   the preparation request command includes a second command to execute an execution window of the operating system, a third command to execute a shell of the operating system using the execution window, and a fourth command to make the shell have a focus.

16. The keyboard device of claim 10, further comprising a device authentication unit for performing a device authentication procedure between the computer and the keyboard device.

17. The keyboard device of claim 16, wherein the computer uses the toggle key in a different way depending on the operating system of the computer.

18. The keyboard device of claim 17, wherein the password is shared by a protocol of a key exchange or a key sharing.

* * * * *